(12) United States Patent
Britto et al.

(10) Patent No.: US 7,689,487 B1
(45) Date of Patent: Mar. 30, 2010

(54) COMPUTER-ASSISTED FUNDS TRANSFER SYSTEM

(75) Inventors: Mark J. Britto, Baton Rouge, LA (US); Aimee K. Cardwell, Palo Alto, CA (US); FuMing Young, Los Altos, CA (US); Nicholas K. Peddy, Redwood City, CA (US); Adrian J. Blakey, Alameda, CA (US); Angela C. Lee, Burlingame, CA (US); Erich L. Ringewald, Kenwood, CA (US)

(73) Assignee: Amazon.com, Inc., Seattle, WA (US)

( * ) Notice: Subject to any disclaimer, the term of this patent is extended or adjusted under 35 U.S.C. 154(b) by 25 days.

(21) Appl. No.: 11/845,977

(22) Filed: Aug. 28, 2007

Related U.S. Application Data

(62) Division of application No. 09/312,028, filed on May 14, 1999.

(51) Int. Cl.
*Q06F 40/00* (2006.01)

(52) U.S. Cl. .............................. 705/35; 705/36; 705/37; 705/38; 705/39; 705/40

(58) Field of Classification Search ............. 705/35–42
See application file for complete search history.

(56) References Cited

U.S. PATENT DOCUMENTS

| | | | |
|---|---|---|---|
| 4,523,087 A | 6/1985 | Benton | |
| 4,727,243 A | 2/1988 | Savar | |
| 4,734,564 A | 3/1988 | Boston et al. | |
| 4,823,264 A | 4/1989 | Deming | |
| 5,237,159 A | 8/1993 | Stephens et al. | |
| 5,393,963 A | 2/1995 | Thomas et al. | |
| 5,472,190 A | 12/1995 | Norling | |
| 5,475,403 A | 12/1995 | Havlovick et al. | |
| 5,491,325 A | 2/1996 | Huang et al. | |
| 5,504,677 A | 4/1996 | Pollin | |
| 5,532,464 A | 7/1996 | Josephson et al. | |
| 5,583,759 A | 12/1996 | Geer | |
| 5,590,038 A | 12/1996 | Pitroda | |
| 5,592,377 A | 1/1997 | Lipkin | |

(Continued)

FOREIGN PATENT DOCUMENTS

WO 9849658 A1 11/1998

OTHER PUBLICATIONS

G. Medivsky, et al., "Electronic Currency for the Internet," University of Southern California (Research Project) (of record in parent application).

(Continued)

*Primary Examiner*—Daniel S Felten
(74) *Attorney, Agent, or Firm*—Knobbe, Martens, Olson & Bear LLP

(57) ABSTRACT

A funds transfer system is disclosed that is responsive to a receipt of a payment request by performing a risk management assessment of an associated payer and payee. If the risk management assessment produces an adverse indication, the payment request is declined. Otherwise, the payment request may be processed by causing funds to be transferred between the payer and payee. The risk management assessment may be performed on the basis of credit and/or authentication information derived from customer information received with or prior to the payment request. Such customer information may, for example, include credit card account information and/or bank account information.

7 Claims, 6 Drawing Sheets

U.S. PATENT DOCUMENTS

| | | | |
|---|---|---|---|
| 5,659,469 A | | 8/1997 | Deaton et al. |
| 5,677,955 A | | 10/1997 | Doggett et al. |
| 5,691,524 A | | 11/1997 | Josephson |
| 5,692,132 A | | 11/1997 | Hogan |
| 5,699,528 A | * | 12/1997 | Hogan .................. 705/40 |
| 5,710,887 A | | 1/1998 | Chelliah et al. |
| 5,727,249 A | | 3/1998 | Pollin |
| 5,732,400 A | * | 3/1998 | Mandler et al. ............ 705/26 |
| 5,757,917 A | | 5/1998 | Rose et al. |
| 5,774,879 A | | 6/1998 | Custy et al. |
| 5,774,882 A | | 6/1998 | Keen et al. |
| 5,781,654 A | | 7/1998 | Carney |
| 5,794,207 A | | 8/1998 | Walker et al. |
| 5,794,219 A | | 8/1998 | Brown |
| 5,799,157 A | | 8/1998 | Escallon |
| 5,802,497 A | | 9/1998 | Manasse |
| 5,815,665 A | | 9/1998 | Teper et al. |
| 5,822,737 A | | 10/1998 | Ogram |
| 5,826,241 A | | 10/1998 | Stein et al. |
| 5,826,244 A | | 10/1998 | Huberman |
| 5,826,245 A | | 10/1998 | Sandberg-Diment |
| 5,832,463 A | | 11/1998 | Funk |
| 5,832,464 A | | 11/1998 | Houvener et al. |
| 5,835,603 A | | 11/1998 | Coutts et al. |
| 5,835,899 A | | 11/1998 | Rose et al. |
| 5,848,400 A | | 12/1998 | Chang |
| 5,869,821 A | | 2/1999 | Lee et al. |
| 5,872,844 A | | 2/1999 | Yacobi |
| 5,884,271 A | | 3/1999 | Pitroda |
| 6,023,685 A | | 2/2000 | Brett et al. |
| 6,029,150 A | | 2/2000 | Kravitz |
| 6,240,396 B1 | | 5/2001 | Walker et al. |
| 6,260,024 B1 | | 7/2001 | Shkedy |
| 7,194,437 B1 | | 3/2007 | Britto et al. |

OTHER PUBLICATIONS

G. Medvinsky, et al., "NetCAsh: A design for practical electronic currency on the Internet," Association for Computing Machinery 1993 (of record in parent application).

B. Clifford Neuman, et al., "Requirements for Network Payment: The NetCheque™ Perspective," Proceedings of IEEE Compcon '95, San Francisco, Mar. 1995 (of record in parent application).

"Credit Card Fraud Against Merchants—What Internet Merchants Need to Know," 1998, CyberSource Corporation, Document 22198, pp. 1-13 (of record in parent application).

"Open Market: Open Market Inc., first to offer complete end-to-end solution for electronic commerce; new company introduces StoreBuilder kit and system to enable merchants to easily build and manage on-line storefronts," Dialog File 810: Business Wire, DialogClassic Web ™, dated Oct. 24, 1994 (4 page web document) (of record in parent application).

* cited by examiner

COMPUTER-ASSISTED FUNDS TRANSFER SYSTEM

RELATED APPLICATIONS

This application is a division of U.S. application Ser. No. 09/312,028, filed May 14, 1999, the disclosure of which is incorporated by reference.

FIELD OF THE INVENTION

The present invention relates generally to electronic commerce (e-commerce) schemes that allow for the transfer of funds between individuals and others via computer networks such as the Internet.

BACKGROUND

The transfer of funds between individuals lies at the heart of a variety of transactions. In single-party transactions, for example involving an account-holder who either deposits or withdraws money from his/her account (e.g., a bank account), only one party participates in the process, although one or more financial institutions may be involved. In unmediated two-party transfers, for example cash transfers between a buyer and a seller in payment for goods or services, gift transfers, loans, etc., there are two parties involved in the transaction. Finally, in mediated three-party transactions using credit or debit cards or checks, a guarantor or other third party in addition to the payer and payee is involved. Increasingly, some or all of these transfers may be completed electronically, making use of computer networks and/or networks of networks, such as the Internet.

Among the more recent developments involving mediated three-party transactions are the expanded opportunities for the use of the Internet as a vehicle by which transfers may be arranged and/or implemented. For example, Internet-based bill presentment systems are now being offered in which a merchant (e.g., a local telephone company or other utility provider) may arrange for regular bills to be delivered electronically to a consumer. The consumer is then offered the option of paying the bill electronically by providing the bill presentment service provider with bank account information and payment authorization. This information (and the accompanying authorization) allows the bill presentment service provider to arrange for the transfer of funds between the consumer's account and that of the merchant, for example using the Automated Clearing House (ACH) funds transfer facilities of the banking industry. Presently, however, such systems are asymmetrical in as much as they do not provide means for individual consumers to arrange for the transfer of funds to other consumers.

Moreover, although the popularity of the Internet has led to a dramatic expansion of e-commerce opportunities, with these opportunities comes the increased risk of fraud in e-commerce transactions. Indeed, some have estimated that close to 40% of the total number of attempted orders placed to Internet merchants are fraudulent or otherwise unapproved credit transactions. See, "Credit Card Fraud Against Merchants", document 22198, CyberSource Corporation, at p. 3 (1998). To combat these fraudulent transactions, others have developed authorization and verification services which attempt to provide some assurance to a seller that a buyer is who he or she is purports to be. Some of these authorization and verifications services include risk management assessment capabilities that score buyers and allow merchants to assess whether or not a transaction should be completed based on the score.

Although these verification services provide some degree of protection against fraudulent e-commerce transactions, they are for the most part limited to a select group of users—namely large merchants. Because of the fees and other system requirements associated with presently existing verification services, small merchants and/or individuals are generally unable to make use of them.

It is also true that wire transfers between individuals across private networks have been available for many years. However, such schemes lack the convenience offered by the Internet. To illustrate, consider that in most wire transfer schemes (other than wire transfers between banks, etc.) an individual (the payer) is required to deposit the funds to be transferred at a physical location (e.g., a local branch office of the wire transfer service). Upon such deposit, payment instructions are transmitted to a remote branch office of the service, where the payee must then present him/herself to receive the funds. While such systems may provide international service, they are cumbersome in as much as both the payer and the payee are required to be physically present to deposit or receive the funds. Often this is impossible, or at least inconvenient, for one or both of these parties.

With wire transfers from one individuals' bank account to another (e.g., utilizing the FEDWIRE system), an initiator must know the recipient's account information and specify it to a bank or other financial institution. Such transactions currently cannot be initiated by consumers using an Internet resource.

Other limitations of current funds transfer schemes (both electronic and otherwise) are highlighted in the transactions that typically occur in on-line, person-to-person auction houses. During on-line auctions, prospective buyers bid on products being offered by sellers. At the close of such bidding, the seller and highest bidder (now the buyer) are notified that the auction has been completed and are usually invited to contact one another to complete the sale. Rarely, if ever, though does the auction house provide a mechanism for the transaction to be completed. Instead, the buyer and seller are left to determine amongst themselves the best way to exchange the goods for payment.

Because the sellers tend to be individuals and not traditional merchants, the sellers often are unable to accept (or, indeed, unwilling to accept) credit cards. Moreover, because the buyers are dealing with an individual seller whom they may not know, the buyer is less likely to be willing to provide such credit card information. Further, as indicated above, the current electronic funds transfer mechanisms are simply not able to accommodate individual-to-individual transfers. This leaves personal checks, which are inconvenient to generate, mail and deposit for the buyer and seller, and which may cause delay in shipping as sellers wait for checks to clear, cashiers' checks, money orders or wire transfers (some or all of which often have processing fees associated with them, not to mention the inconvenience of having to obtain a payment instrument from a bank or other institution) as the only viable payment options. Generally, none of these solutions are very satisfactory from the buyer's point of view, yet the buyer is left having to choose one of these options if he or she wishes to complete the sale. Thus, there is a need for a payment transmission system for e-commerce transactions and/or to facilitate money transfers between individuals and/or small merchants that overcomes the limitations of existing schemes.

SUMMARY

The present scheme is generally directed to methods and apparatus that allow individuals (e.g., private individuals, small merchants or other non-traditional merchants/sellers) to transmit funds between one another (usually one-way transfers, but the scheme can certainly be extended to two-way transfers) utilizing the services offered by an electronic transaction system. The scheme is also scalable to large merchants, where desirable. Such transactions may be in support of purchases (e.g., on-line purchases from on-line auctions, electronic bulletin boards, electronic classified adds, etc.); debt settlements; money transfers (e.g., electronic wiring of funds); gifts; charitable donations; bill payment; or any other transaction that requires the exchange of funds.

In one embodiment, a payment request associated with a two-sided transaction (for example a money transfer or an auction transaction) is received at a computer resource accessible through the Internet (e.g., a server or other computer system). Upon such receipt, a risk management assessment for the payment request is performed. This risk assessment is performed for parties on each side of the transaction, that is payee(s) and payer(s). If the risk management assessment procedure produces an adverse indication, the payment request is declined. Otherwise, the payment request may be processed for delivery of a payment associated therewith.

The risk management assessment may be performed on the basis of credit and authenticating information derived from customer information received with (or even prior to) the payment request. Such customer information may include credit card account information and/or bank account information (e.g., checking account information).

Further credit information may then be obtained from a third party that is not directly associated with the transaction. For example, such a third party may be a credit card issuing agency, a bank, and/or an electronic check acceptance and/or guarantee service provider. In some cases, the risk management assessment process may include an automated component and a manual (non-automated) component. Such a manual component may be needed where the automated component of the risk management assessment process provides suspect information regarding one or more of the parties to the transaction.

Often, the payment request will itself provide the customer information in response to one or more solicitations therefor. For example, payer and/or payee information (either or both of which may be specified as an e-mail address) may be provided in response to Web forms that are presented to one or more of the parties to the transaction. For example, Web forms that request the above customer and/or credit information (e.g., credit card and/or bank account information) may be provided.

Where the payment request is processed for delivery of the payment, such processing may include submitting a payment authorization request, and, upon receiving a settlement indication regarding that payment authorization request, transmitting the payment. In some cases, the payment may be transmitted as a check, while in others it may be transmitted as a money order or instructions to have funds automatically deposited into an account. Generally, where the latter method is used, the account will have been identified by a party to the transaction either prior to or subsequent to the transaction itself. For example, payees may register with the electronic transaction system providing the payment service and thereby provide account information prior to any transactions.

The payment authorization request itself may be submitted to a party that is not directly associated with the transaction (e.g., not the payer or the payee). For example, a credit card issuer and/or a check acceptance and/or guarantee service provider may be the party to which the payment authorization request is provided. Such parties generally provide the promise settlements of these requests (i.e., authorizations) within a few hours of the request. The settlement indication received from such a party may include the funds needed to satisfy the payment authorization request. As indicated above, funds may then be transmitted to the seller using one of the above-described processes.

Each of these figures illustrates exemplary details concerning one or more embodiments of the present invention, however, these details should not be deemed to limit the broader spirit and scope of the present invention as set forth in claims which follow the accompanying description.

DETAILED DESCRIPTION

Described herein is an electronic transaction system for computer assisted (e.g., on-line/e-commerce) transactions. Throughout this discussion, reference will be made to various environments within and around which the systems and methods of the present invention may find application. Examples of such environments include funds transfers between individuals and/or small merchants, perhaps in settlement of private debts (e.g., Internet-based or other e-commerce transactions such as auction purchases, or debts incurred as a result of other processes), gift transfers, loans, etc. Of course, the present scheme is also applicable in other environments. For example, the systems and methods described herein may be applied in transactions involving donations to charity organizations, collections for office pools or group gifts, etc. Therefore, it should be recognized that the present invention is in no way limited by the examples presented herein.

The electronic transaction system supports an Internet-based (or other computer/network-based) funds transfer service that provides some measure of fraud protection for payers and payees in that risk management assessments for parties on each side of a transaction are conducted. In the event the risk management assessment procedure produces an adverse indication (e.g., an indication that a credit card a payer is attempting to use has been reported stolen, or that the identity of the person attempting to initiate or receive payment can not be authenticated, or that account information provided by the payer indicates that insufficient funds are available to complete the transaction and/or that the payer or payee otherwise poses a risk) the payment request associated with the transaction will be declined. Otherwise, the payment request can be processed for delivery of a payment associated therewith to the payee. Thus, payers and payees receive the benefit of a risk assessment process that is not normally accorded to or available for individuals or small merchants with existing authorization and verification services. This service is particularly useful in person-to-person commerce, where the parties do not know one another.

Figure 1:
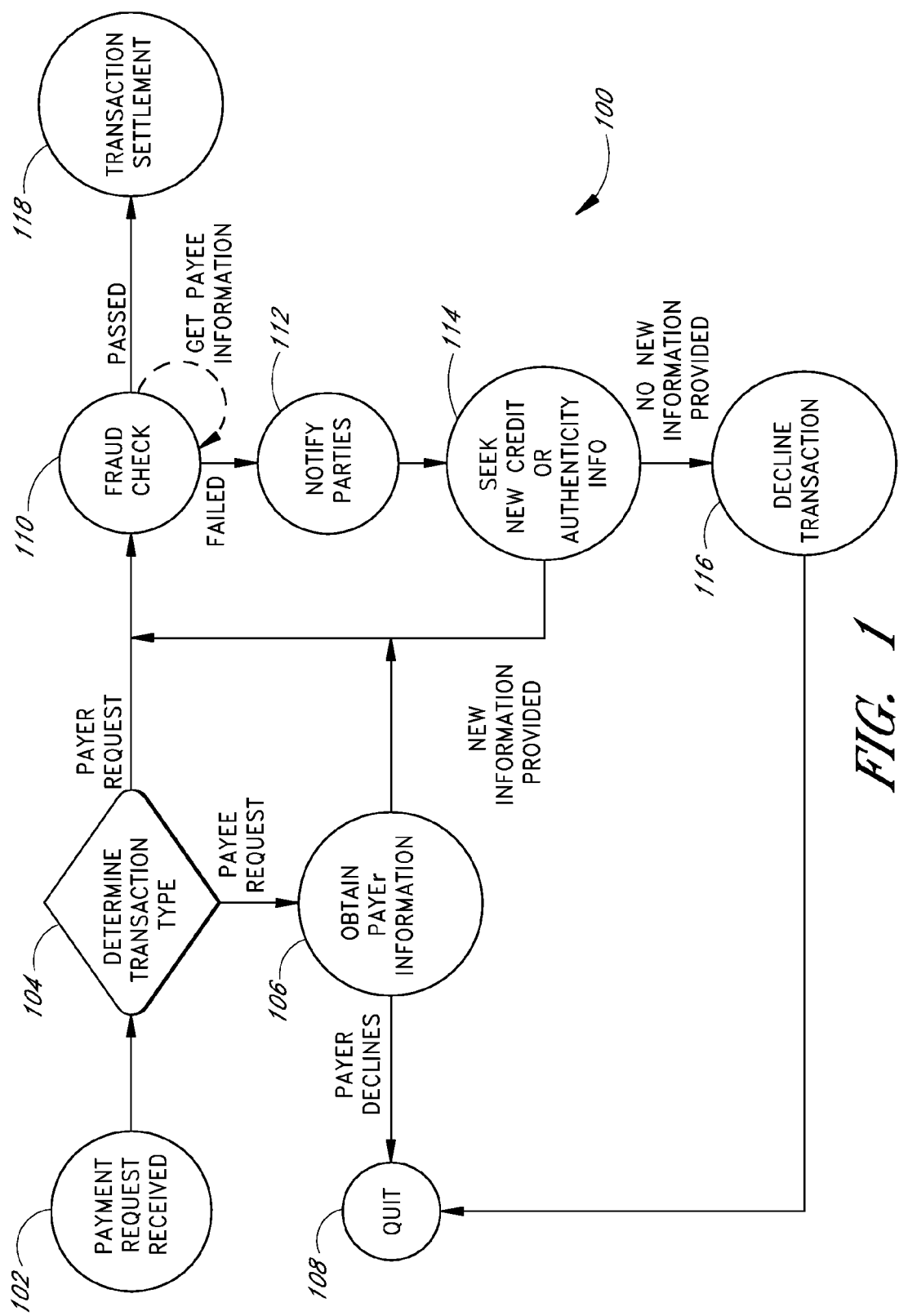
FIG. 1 is a flow diagram illustrating processing steps to be performed by an electronic transaction system in accordance with embodiment of the present invention.

To better understand these procedures, refer first to FIG. 1, which illustrates one example of an overall funds transfer process 100 implemented by the electronic transaction system. At step 102, a payment request is received. The payment request may come in a variety of forms. For example, in some cases the payment request will be a request by a payer to transfer funds to a designated payee (or payees). In other cases, the payment request may be a request to collect funds for a payee from a designated payer (or group of payers). Where the funds transfer process is implemented as a set of computer-readable instructions (e.g., as embodied on a computer-readable medium such as a memory, a CD-ROM or other storage medium), the electronic transaction system may make use of a Web server accessible through the Internet (and its graphical user interface, the World Wide Web) and the payment request may be submitted through the use of Web forms.

In general, a Web form is a collection of form fields displayed as a Web page by a Web browser in response to hypertext markup language (HTML) tags and other information received from a Web server. An associated form handler resides at the server to collect and process the information submitted by a user via the form. By using such forms, the information collection process performed by the server is made interactive with the users. That is, users can add text to text boxes, select from drop down menus and/or select check boxes and/or radio buttons, etc. Typically, the user submits the Web form by clicking on (i.e., selecting with a cursor control device) a submit button or other appropriately labeled element of the form and, upon such submission, the contents of the form are passed to the form handler. Depending upon the type of information being submitted and the type of form handler being used, the information submitted by a user may be appended to a file maintained by the server, for example a file associated with an account assigned to the user for the transaction of interest. In this way, information regarding the transaction may be collected, processed and displayed to those who access it.

Thus, in the present example, a server hosting the funds transfer service may be configured to provide HTML instructions using the hypertext transfer protocol (HTTP) so as to cause a user's Web browser to render one or more Web forms for use in submitting a payment request. Such Web forms may be organized as check box fields, radio button fields and/or other form fields such as text box fields or drop down menus, etc. through which users can specify payer and payee information (e.g., as e-mail addresses), payment amount information, payment method information (e.g., credit/debit card/ account and/or checking account information) credit information, account information, etc. Where the transaction is in support of an auction, additional information such as the terms of the auction purchase (e.g., the item description and identification number, if any, etc.) and any other transaction fees may also be included in the payment request. The precise nature of the Web form(s) to be used to collect the payment request is not critical to the present invention.

The payment request is reviewed at step 104 and a determination is made as to whether the payment request is by a payee or a payer. If the request was submitted by a payee (i.e., someone is asking the funds transfer service to contact others and ask that they use the service as a payment vehicle), then the payer(s) will have to be contacted. One way in which this contact may be initiated is through electronic mail (e-mail) messages transmitted by the funds transfer service on behalf of the payee.

For example, using payer information (such as e-mail addresses) entered by the payee as part of the payment request, the funds transfer service (e.g., a server operated thereby) may transmit e-mail messages to the payer(s) indicating that the payee has requested use of the service to facilitate a payment. The payer(s) may be presented with a uniform resource locator (URL) that specifies a Web address of the service. By pointing a Web browser at that Web address, payers may register with the service (if they are not already so registered), access the transaction of interest (i.e., the one initiated by the payee) and provide payment instructions. This procedure is reflected at step 106, where payer information is obtained. In those cases where a payer declines the invitation to use the service, the process quits at step 108, and the payee may be notified (e.g., by e-mail message) of the payer's refusal to participate.

Where a payer does agree to participate in the transaction, or where a check on the payment request indicates it is being made by a payer (i.e., someone that is trying to send money to one or more others), a fraud check is initiated at step 110. The fraud check is an opportunity for the funds transfer service to verify/analyze the credit, authentication and/or other information provided by the payer (either as part of the payment request or in response to a payee request). The criteria by which this assessment is made may vary from transaction to transaction but may include such factors as the amount being transferred, the payer's payment preferences (e.g., use of credit card, debit card or electronic check authorizing retrieval of funds directly from a checking account), prior user history or other criteria (as discussed below).

In addition, the fraud check (or more generally, the risk assessment process or which the fraud check is a part) may obtain payee information to verify/authenticate the payee. Such information may be obtained from a stored database of payee information, or, where the transaction involves a new payee, may be obtained directly from the payee. For example, much in the same way the service is able to contact prospective payers, so too can intended payees be contacted (e.g., through e-mail messages). These payees can then be allowed to register with the service and, in doing so, will be asked for credit and authentication information that will allow for the risk assessment scoring noted above. Note that both payers and payees may be asked for authorization to allow the service to contact third party agencies to obtain further credit and/or authenticating information to assist in the fraud check process.

In some cases, this fraud check may indicates that the transaction is one which poses a high degree of risk and/or that review by non-automated means (e.g., human risk management assessors) is needed. Where needed, such a manual review process may be performed. If, in the end, the transaction fails the fraud check procedure, then the payer(s) and/or the payee(s) may be so notified at step 112, for example by e-mail messages. As part of such messages (e.g., the messages transmitted to the payer(s)) or in follow up communications, a request for additional information (e.g., additional authentication information, an alternative credit card and/or bank account, or another form of payment and/or its related authenticating information, etc.) may be made at step 114. This provides the payer(s) with another opportunity to complete the funds transfer. If the additional information is provided, the fraud check process may be reinitiated on the basis of this new information. Otherwise, if no new information is provided by the payer(s), the transaction is declined (step 116) and the process terminated.

Assuming that the fraud check process is passed successfully, the transaction may be settled at step 118. Depending upon the payment method and/or the payee's preferences (which may be indicated as part of the registration process discussed above), this settlement may be accomplished in one of a number of forms. For example, the credit card or electronic check information submitted by the payer may be passed to a third party not otherwise associated with the transaction for processing to obtain funds. Several existing companies provide for such services. For example, Cyber-Source Corporation provides fulfillment services for credit card transactions. Similarly, TeleCheck provides for fulfillment of electronic check transactions. Either of these services or another electronic check and/or guarantee service provider may be used for the fulfillment operation to obtain the funds authorized by the payer(s).

Once the funds transfer system receives an indication that such funds have been made available (e.g., by deposit into a merchant account maintained by the service), instructions for transfer to the payee may be issued. These instructions may prompt the generation of a physical check or other payment instrument (e.g., cashiers' check or money order) to be provided to the payee. In other cases, where the payee has chosen to have funds automatically deposited to an account (e.g., via an ACH transaction), these instructions may authorize such a transfer. Where automated transfers (e.g., ACH transfers) are used, such transfers may be made individually or in an aggregate fashion (e.g., daily, weekly, monthly, etc.) and statements provided upon completion thereof. In some cases, the ACH transactions may be initiated by a bank rather than by the electronic transaction system itself—in other words, the electronic transaction system may generate instructions for a bank; rather than initiating the ACH transaction directly.

Figure 2:
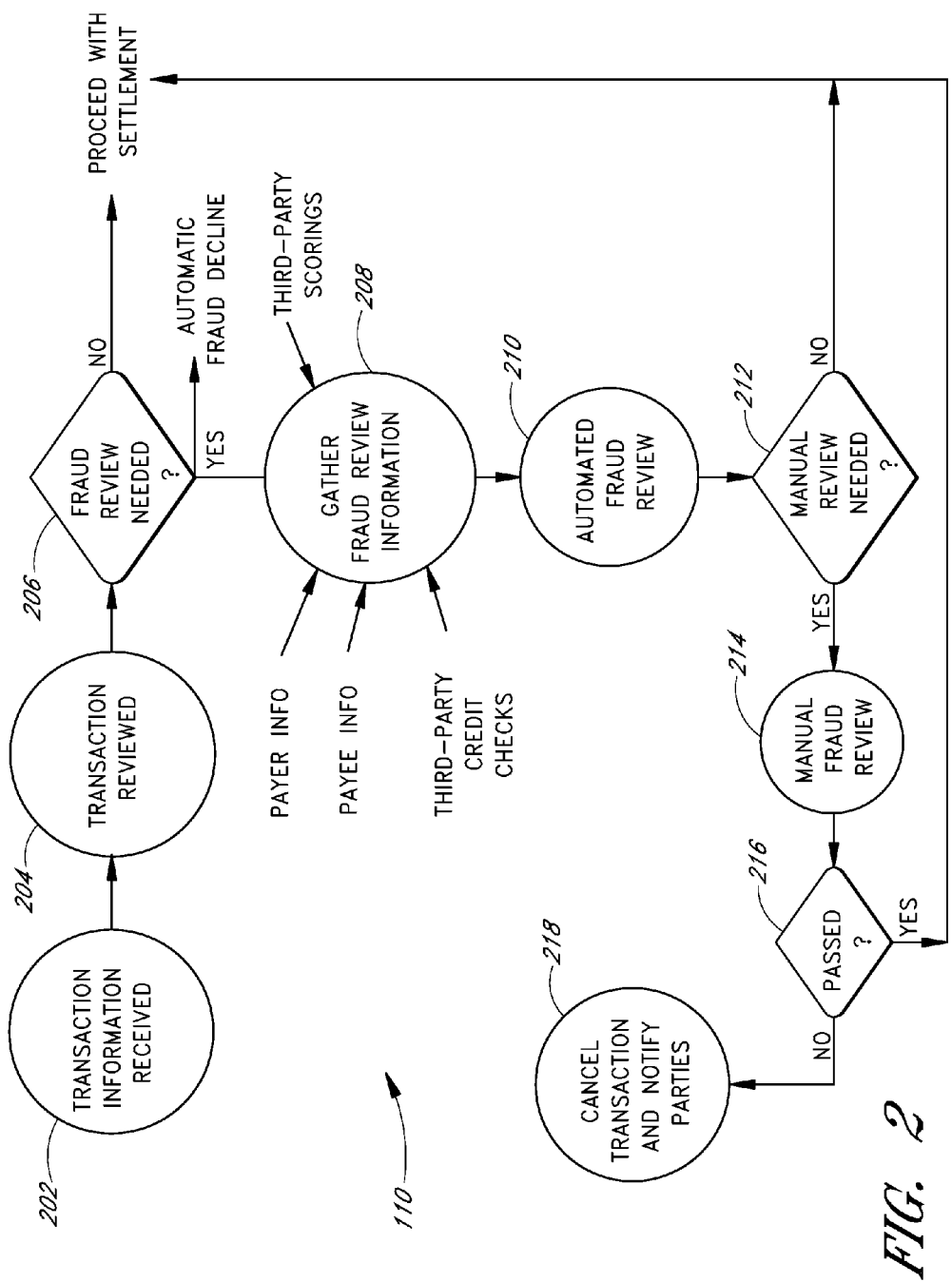
FIG. 2 is a flow diagram illustrating one example of a fraud review process for use by the electronic transaction system in accordance with an embodiment of the present invention.

FIG. 2 illustrates further details regarding the fraud check process. Once the transaction information (e.g., identity of the parties, payment method, etc.) has been received at step 202, the transaction is reviewed at step 204. Note, these steps may include some or all of the payment request receipt and/or payer/payee invitation processes described above. Then, at step 206, a determination is made as to whether a fraud review process is needed. In some cases, this review will indicate that the transaction should be automatically declined. For example, the review at step 204 may have indicated that the transaction is one which exceeds a certain dollar amount or is intended for payment to a payee located in a region not serviced by the funds transfer service. In other cases, the transaction may be one that is below a certain dollar value that indicates no fraud review should be undertaken and settlement may proceed.

In general, however, some form of the fraud review/risk assessment process will be undertaken and that procedure may utilize information provided by a variety of sources. For example, user (e.g., payer and/or payee) data (authentication information) such as names, addresses, income, date of birth (and/or other demographic data) etc., may be used to identify the individuals seeking to complete the transaction. Also various forms of authorization (both electronic and/or physical) provided by third parties (credit card issuers, check acceptance/guarantee services, credit scoring agencies, etc.), credit history reports (e.g., as provided by credit reporting agencies, etc.) and/or previous transaction histories of the payer(s)/payee(s) (e.g., based on records of previous transactions involving the individual parties and/or the pair) may be used to assess the risk involved in the transaction. Thus, at step 208, some or all of this information is gathered and then applied during an automated fraud review at step 210.

If the results of this automated fraud review indicate that no further manual review (i.e., by human reviewers) is needed—a determination made at step 212—the transaction may proceed to settlement. Otherwise, if a manual review is required, that review is undertaken at step 214, for example using credit review and/or fraud review procedures well known in the industry. Ultimately, a decision is reached (step 216) as to whether the transaction will be accepted or declined. In the event that the transaction is declined (step 216) the payer(s) and payee(s) are so notified (e.g., via an e-mail message) at step 218 and the payer(s) may have another opportunity to submit additional credit and/or authenticating information in an attempt to complete the transaction, as noted above. Otherwise, where no further information is needed, the transaction may be passed for settlement.

Figure 3:
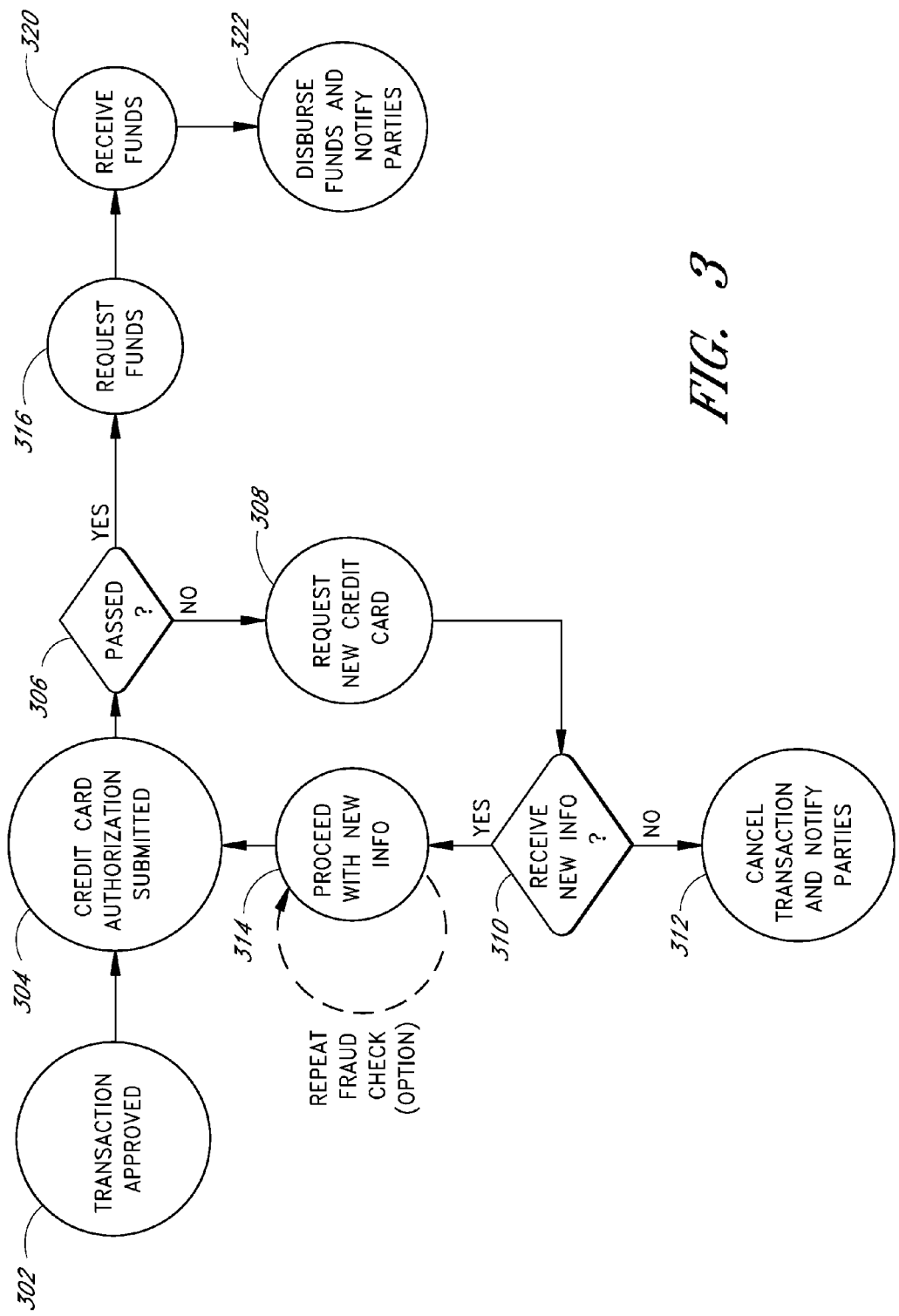
FIG. 3 is flow diagram illustrating an example of a collection and processing sequence for the electronic transaction system for use with credit card payments in accordance with an embodiment of the present invention.

FIG. 3 illustrates further details regarding the processing of a credit card transaction 300. Once transaction approval has been received (step 302) following the fraud check process described above, the credit card information provided by the payer is submitted to a third party verification/authorization service (e.g., the credit card issuer) at step 304. The third party service will determine whether the credit card is authorized for the transaction and will provide an indication in accordance therewith. The electronic transaction system then determines whether the transaction has been authorized (step 306). If the transaction has not been authorized, the electronic transaction system requests further credit information (e.g., another credit card) from the payer at step 308. Such information may be requested via e-mail correspondence between the service and the payer (with or without notification to the payee).

At step 310 a determination is made as to whether the payer has provided such credit information and, if not, the transaction is canceled at step 312 and the parties are so notified (e.g., via e-mail). When the payer does provide the new credit information (step 314) that new information is used to complete the transaction (and possibly is used to perform an updated risk management assessment). This process repeats until authorization for the transaction is received or the transaction is canceled.

Once authorization has been received, the transaction is submitted to a third party fulfillment service at step 316. In other words, funds are requested. This fulfillment service may be the same service that provided the credit verification check or it may be a different service. Generally, the fulfillment service will be the credit card issuer.

At step 320, settlement details are provided by the fulfillment service. For example, the settlement details may include the necessary funds to complete the transaction. These funds may be deposited into an account maintained by the funds transfer service provider. Alternatively, the settlement details may only indicate that funds will be made available at a later time (e.g., the next business day). Ultimately, the settlement details may be reconciled with the payment request by the electronic transaction system and a reconciliation report generated. Moreover, the actual receipt of funds may occur at this time.

Once the settlement has been reconciled, the parties may be notified (e.g., via e-mail) and the funds made available for transmission to the payee (step 322). For example, the funds may be deposited into a merchant account used by the funds transfer service. Then, the merchant bank at which the merchant account is maintained may be instructed to pay the payee via a physical check, ACH deposit or other means of payment. Alternatively, funds may be provided directly by the service to the payee in the form of a physical check, ACH deposit or other means of payment.

Figure 4:
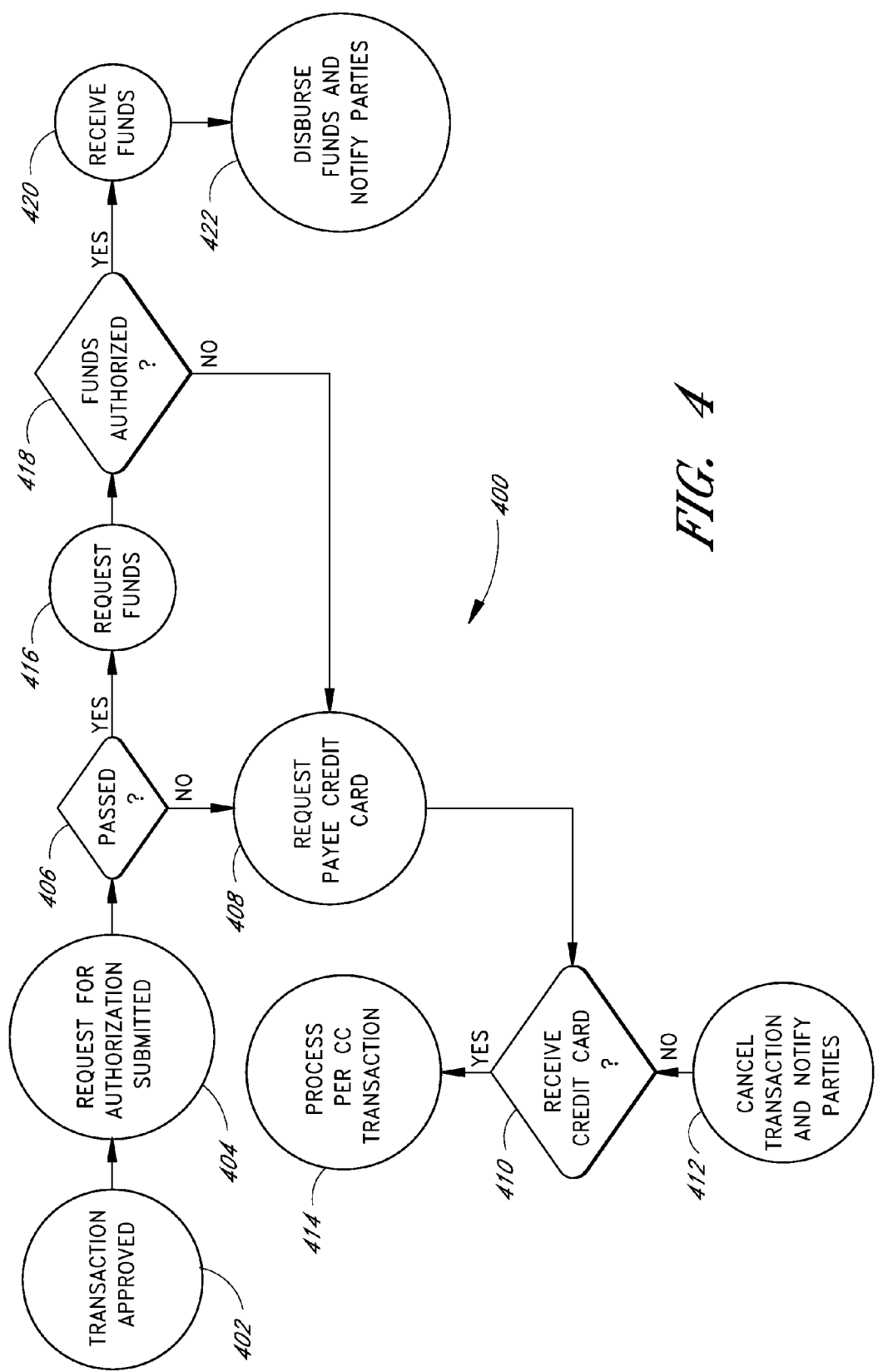
FIG. 4 illustrates an alternative collection and processing sequence for use with electronic checks in accordance with an embodiment of the present invention.

FIG. 4 shows a similar process 400 for payment processing where electronic checks are used. For example, once the transaction has passed the fraud review process (step 402), the electronic check authorization information may be provided to a third party to provide the fulfillment process (step 404). For example, once the fraud check has been satisfied, the electronic transaction system may instruct an associated merchant bank to initiate an ACH pull transaction from the payer and wait to see if there are good funds. Alternatively, the transaction may be out-sourced to a check guarantee service to guarantee the check, and that provider may then initiate the ACH pull.

In any event, the fulfillment service provider will indicate whether or not the transaction is authorized (e.g., whether sufficient funds exist to complete the transaction or whether they will guarantee the payment) and a determination is made at step 406 by the funds transfer system as to whether or not authorization has been obtained. In the event authorization has not been obtained, the funds transfer system may request credit card information from the payer (step 408). Where credit card information is sought (step 410) but not provided, the transaction is canceled and the parties are so notified (step 412) (e.g., via e-mail). Where the credit card information is provided, the funds transfer system may attempt to complete the transaction using the above-described credit card payment process (step 414).

Where authorization for an electronic check has been obtained, the funds transfer system will request funds from the third party fulfillment service (step 416). In some cases, the request for funds may be combined with the authorization request. In those cases where no funds are authorized (see step 418 for this determination), the system may attempt to complete the transaction using credit card information. Otherwise, settlement details provided by the fulfillment service will be reconciled with the payment request once funds are received (step 420), the parties may be so notified and funds allocated for the payee (step 422), as described above. Again, the output may be an ACH transfer.

One variation on this procedure involves an "express" service wherein a third party check guarantee service is used. In such cases, funds that are guaranteed by the third party (e.g., based on the bank account information provided by the payer, may be transmitted directly to the payee, prior to receiving an indication that the funds are actually available. Later reconciliation with the payer's account may cause the funds to be transferred to the service.

Figure 5:
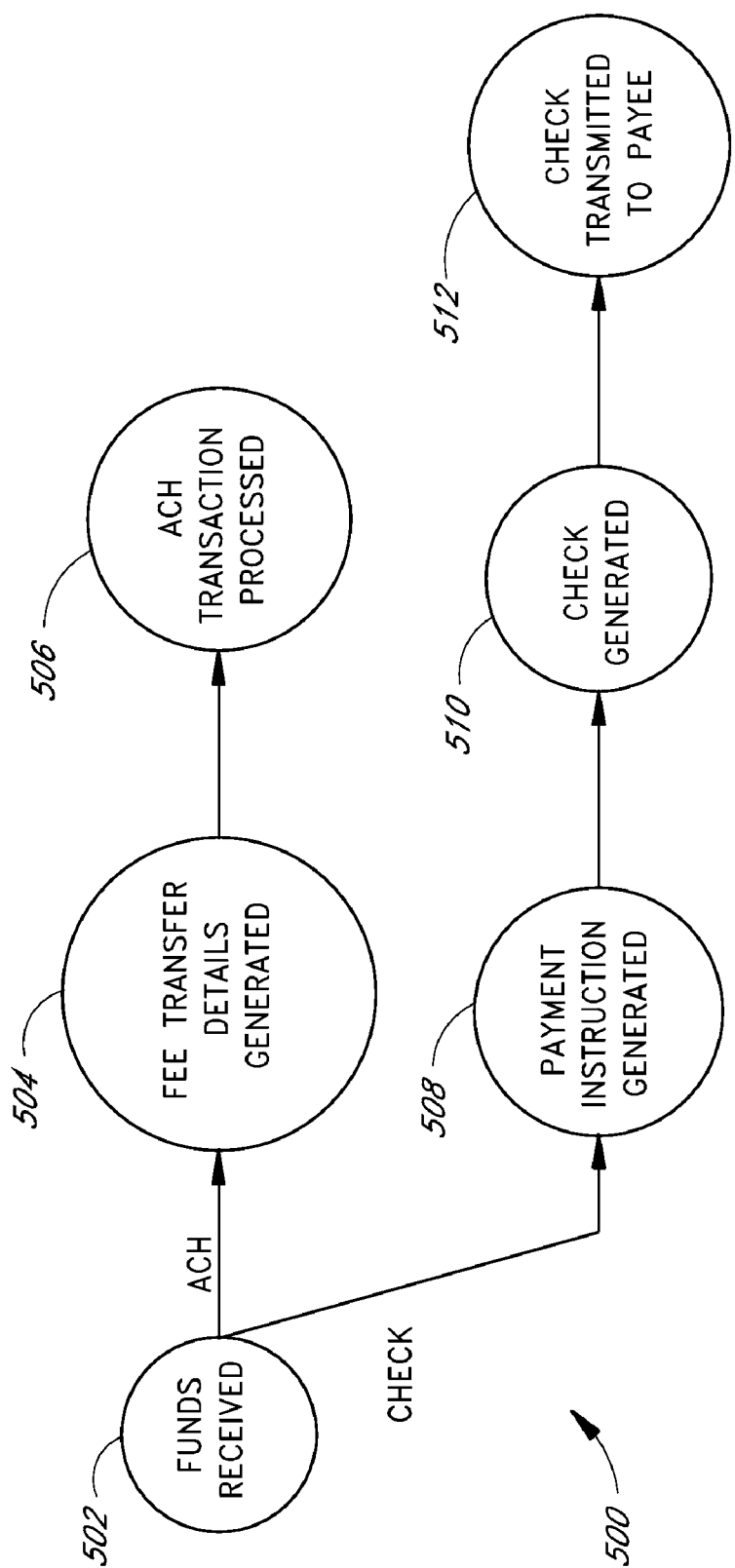
FIG. 5 is a flow diagram illustrating further details for an example of payment processing performed by the electronic transaction system in accordance with an embodiment of the present invention.

FIG. 5 shows further details of a payment process 500 as may be used by the funds transfer system in accordance with one embodiment of the present invention. Once confirmation that funds have been received (e.g., deposited into a merchant bank account maintained by the electronic payment service provider) is obtained (step 502) one of two options for transmission of these funds to the payee may be employed. In most cases, the payee will have indicated which payment option is preferred. The first option allows for automated deposited in an account specified by the payee, through the use of the ACH facilities of the banking industry. Within this option, at step 504, the fee transfer instructions are provided to a merchant bank at which the funds service provider maintains an account and, at step 506, the funds are transferred to the account specified by the payee through ACH process in accordance with conventional wire transactions between banks. In other cases, the ACH transaction may be initiated by the funds transfer system directly, without the use of a merchant bank. Of course, in other embodiments, other payment mechanisms may be used.

Where the payee chooses instead to receive a hard copy check (or other instrument such as a money order), payment instructions will be generated at step 508 and the check (or money order, etc.) generated at step 510. Ultimately, a hard copy instrument is transmitted to the payee at step 512.

Figure 6:
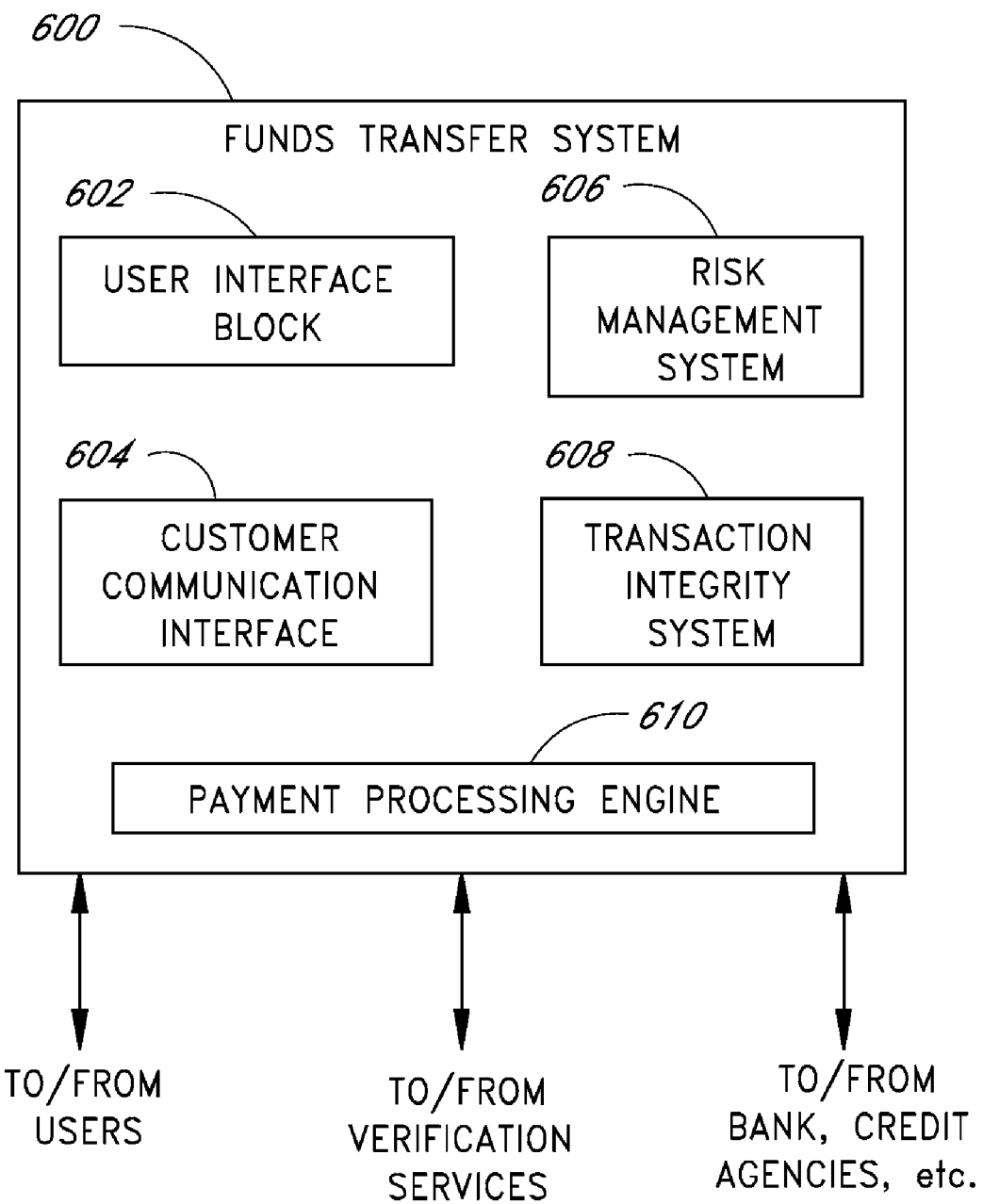
FIG. 6 illustrates functional components of an electronic transaction system in accordance with an embodiment of the present invention.

FIG. 6 now illustrates the main components of a funds transfer system 600 configured in accordance with an embodiment of the present invention. This system may be embodied as hardware and/or software components of a server or other computer system as is customary in the art. As was implied above, system 600 includes a user interface block 602, which may be utilized by payers and payees for the registration and payment request operations discussed above. Thus, this user interface 602 implements the customer dialog described above (e.g., by soliciting and receiving transaction and payer/payee information) and may process the Web forms submitted by the users.

Operating in conjunction with the user interface block 602 may be a customer communication interface block 604. Such a block may support the automatic distribution of update reports regarding the various stages of processing a payment request. For example, e-mail messages may be transmitted to the parties regarding the successful (or unsuccessful) processing of the payment request as discussed above.

A risk management system 606 which implements the above described fraud review processing is also an element of electronic transaction system 600. So too is a transaction integrity system 608 which supports the interaction with the third party authorization and verification services using the methodology described above. Finally, a payment processing engine 610 may be used to complete the payment procedures described above. In each case, the particular implementation details for the various components of system 600 may vary from one embodiment to another, but the overall function provided by these components is as discussed with respect to the various transaction processing operations detailed above.

Thus, a funds transfer system for computer assisted transactions has been described. The service provided by such a system may be self-replicating in as much as users who are seeking to transmit funds to non-registered individuals may themselves act as conduits for spreading usage of the system. For example, a non-registered individual who is to receive a payment or to whom a request for payment is sent may be provided with an invitation to register with the service (e.g., as part of an e-mail message regarding the payment transfer). Indeed, such registration may be required before the transfer can be completed. In this way more and more individuals may become registered users. Of course, although the present scheme has been discussed with reference to various illustrated embodiments, it should be appreciated that the present invention is not limited thereby and, instead, is to be measured only in terms of the claims which follow.

What is claimed is:

1. A funds transfer system, comprising:
   a computer system that implements a funds transfer service;
   a web-based user interface hosted by the computer system, the web-based user interface including functionality for payers and payees to register with the funds transfer service, and including functionality for at least the payers to generate payment requests for initiating funds transfer transactions with payees; and
   a risk management system implemented by the computer system, said risk management system being responsive to a payment request generated by a payer for transferring funds to a payee by at least (1) performing an automated risk assessment of both the payer and the payee using information supplied by at least the payer and payee via said web-based user interface, wherein the automated risk assessment of the payee is based additionally on risk assessment scoring provided by a third party that is not directly associated with the requested transfer of funds, and (2) declining the payment request when the automated risk assessment produces an adverse indication.

2. The funds transfer system of claim 1, wherein the risk management system is further responsive to the payment request by sending a request for information to the payee, and by using information supplied by the payee in response thereto to perform the automated risk assessment.

3. The funds transfer system of claim 1, wherein the risk management system is operative to perform the risk assessment based in part on information obtained from a credit bureau.

4. The funds transfer system of claim 1, wherein the risk management system is operative to perform the risk assessment based in part on information obtained from a credit card issuing agency.

5. The funds transfer system of claim 1, wherein the risk management system is configured to notify the payer and payee when the risk assessment produces an adverse indication.

6. The funds transfer system of claim 1, wherein the risk management system is configured to flag a funds transfer transaction for manual review when the automated risk assessment produces an adverse indication.

7. The funds transfer system of claim 1, wherein the risk management system is operative to take into consideration, in performing said automated risk assessment, a payment amount associated with the payment request.

* * * * *